(12) United States Patent
Yamashita et al.

(10) Patent No.: US 8,252,440 B2
(45) Date of Patent: Aug. 28, 2012

(54) SEALED BATTERY

(75) Inventors: Syuichi Yamashita, Moriguchi (JP); Masanori Ogi, Moriguchi (JP); Toyoshige Muto, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 423 days.

(21) Appl. No.: 12/395,865

(22) Filed: Mar. 2, 2009

(65) Prior Publication Data
US 2009/0226799 A1   Sep. 10, 2009

(30) Foreign Application Priority Data
Mar. 7, 2008  (JP) .................. 2008-058693

(51) Int. Cl.
*H01M 4/00* (2006.01)
*H01M 2/12* (2006.01)
*H01M 2/00* (2006.01)

(52) U.S. Cl. ............. 429/94; 429/56; 429/163; 429/164

(58) Field of Classification Search .......... 429/56, 429/94, 163–164
See application file for complete search history.

(56) References Cited

FOREIGN PATENT DOCUMENTS
| JP | 06-196138 A | | 7/1994 |
| JP | 2003-229177 A | | 8/2003 |
| JP | 2003229177 A | * | 8/2003 |

* cited by examiner

*Primary Examiner* — Karie O'Neill Apicella
(74) *Attorney, Agent, or Firm* — Westerman, Hattori, Daniels & Adrian, LLP

(57) ABSTRACT

The present invention provides a sealed battery 10 including an electrode body 14 formed by winding a positive electrode plate 11, a negative electrode plate 12 and a separator 13 interposed therebetween so as to have a hollow portion 14a at the center, a tube-shaped center pin 20a inserted in the hollow portion 14a, a battery outer can 17 containing the electrode body 14, an external terminal 19 also serving as a safety valve 18 evacuating gas when a gas pressure in the battery outer can 17 exceeds a predetermined value. A slit 24a is formed on a peripheral surface of the center pin 20a, and a cutout part 22a is formed on at least an end of the center pin 20a at the external terminal 19 side.

8 Claims, 4 Drawing Sheets

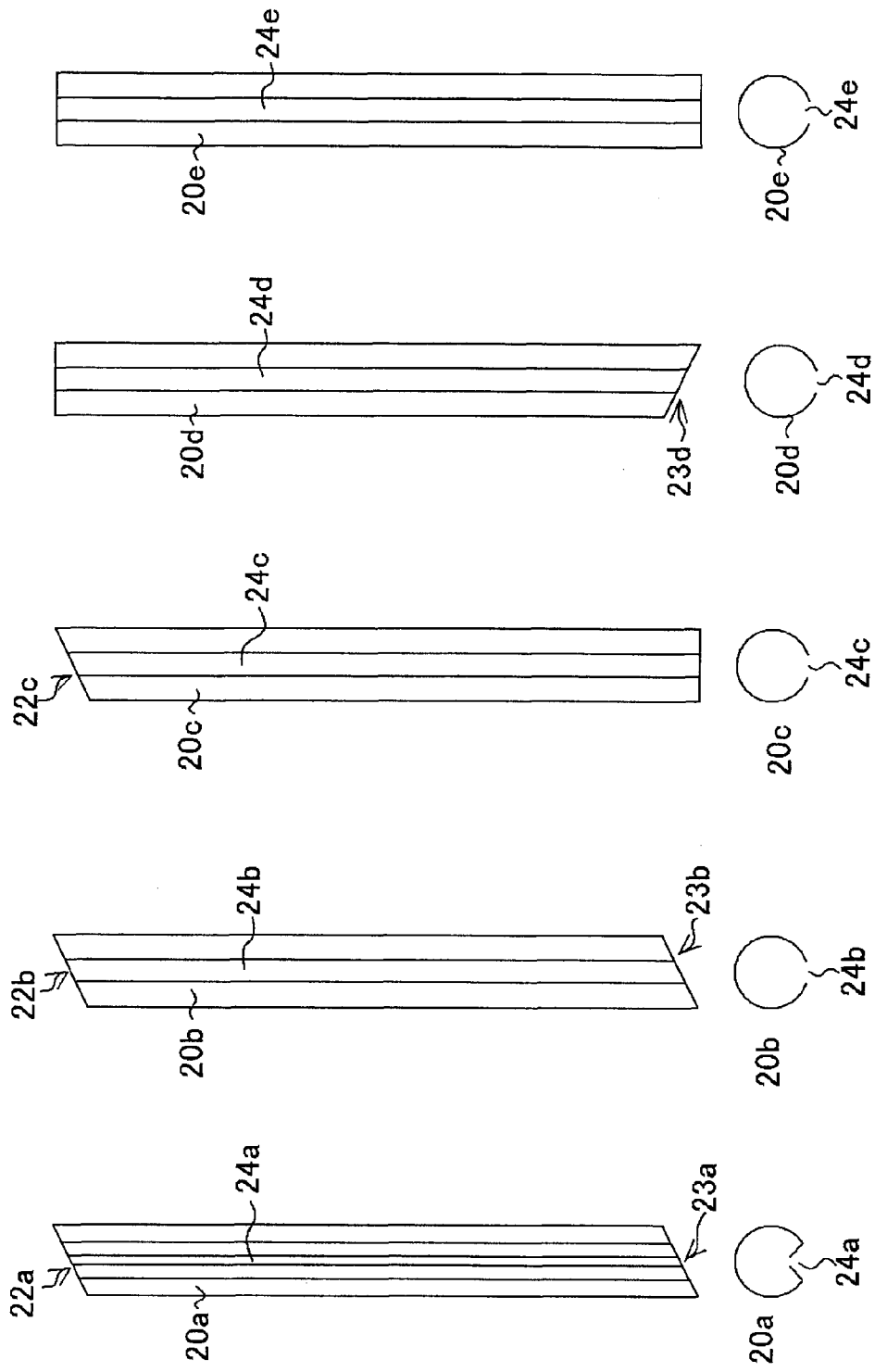

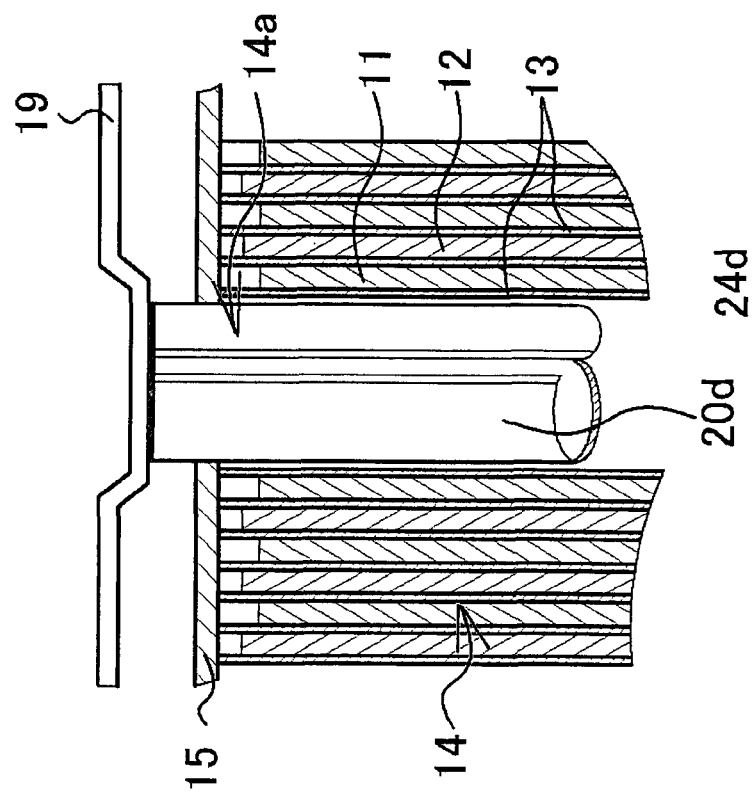
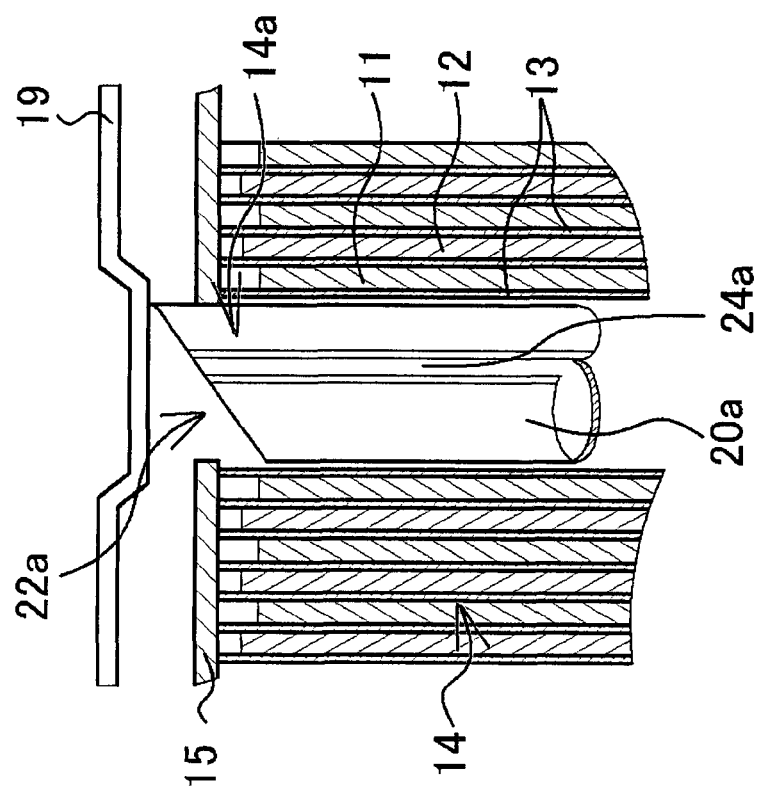

SEALED BATTERY

TECHNICAL FIELD

The present invention relates to a sealed battery and especially relates to a sealed battery having a structure that a tube-shaped center pin is inserted in a hollow portion positioned inside a spirally wound electrode body.

BACKGROUND ART

As portable equipment has spread in recent years, sealed batteries with a compact size, a lightweight, and a high energy density are required for the power supplies of the portable equipment. Among sealed batteries, from the viewpoint of economical efficiency, secondary batteries able to be charged and discharged, such as a nickel-hydrogen storage battery and a lithium ion secondary battery, have been used commonly. Especially, a nonaqueous electrolyte secondary battery represented by the lithium ion secondary battery has been used commonly because of its lighter weight and higher energy density than other secondary batteries.

However, if the secondary battery is overcharged by a longer current supply than normal at the time of charging or is short-circuited by a high current due to improper use, failure of the using equipment or the like, an electrolyte is degraded to generate gas, and an internal pressure of the battery is increased by the gas generation. Furthermore, if the overcharged or the short-circuited state continues, the battery temperature increases rapidly due to the heat generation from the electrolyte and then the sealed secondary battery sometimes explodes suddenly to break the equipment being used. Thus, especially, in the case of the nonaqueous electrolyte secondary batteries, batteries with a safety valve for explosion protection have been used in the related art (see JP-A-6-196138 and JP-A-2003-229177).

The safety valve needs to be activated reliably from the viewpoint of the prevention of equipment breakage, the prevention of a fire accident, and the like. Thus, in the related art, as shown in JP-A-6-196138, a positive electrode plate is placed to oppose a negative electrode plate interposing a separator therebetween, and the whole thereof is wound so as to have a hollow portion at the center to form an electrode body, the electrode body is placed in a battery outer can, and a cylindrical-shaped center pin is placed in the hollow portion of the electrode body, so that the generated gas due to overcharge and the like is led to the safety valve through the center pin placed in the hollow portion of the electrode body. The center pin is arranged in order that a passage of the gas is not blocked by a broken hollow portion caused as the result of a generated gas pressure in the nonaqueous electrolyte secondary battery, since the pressure is exerted on the overlapping direction of the positive electrode plate, the negative electrode plate and the separator.

Furthermore, from the aspects of cost and gas exhaust efficiency, the center pin is generally formed by winding a long thin metal plate in the width direction so as to be tube-shaped. Thus, both edge parts of the thin plate in the circumferential direction of the center pin are not joined and a slit is left between both edge parts. The slit formed on the center pin has roles that not only the passage of the gas generated in the nonaqueous electrolyte secondary battery is secured reliably to activate the safety valve normally, but also a flow of a nonaqueous electrolyte is improved. That is, in the nonaqueous electrolyte secondary battery, since the nonaqueous electrolyte can flow in and out of the center pin through the slit, a flow of the electrolyte in the nonaqueous electrolyte secondary battery is good and ions are exchanged smoothly, so that the battery performance can be enhanced.

However, when the nonaqueous electrolyte secondary battery is dropped down from a high location or an object is dropped on the nonaqueous electrolyte secondary battery, the battery outer can is deformed. In this manner, if the battery outer can is deformed, the center pin placed in the battery also may be deformed. If the center pin is deformed, an edge part facing the slit may stuck to the electrode body to break the separator, and short circuit occurs locally in the electrode body leading to an excessive short circuit current flow. This may cause the nonaqueous electrolyte secondary battery to generate an abnormal heat.

Therefore, in the invention disclosed in JP-A-2003-229177, the edge part facing the slit of the center pin is placed inside of a virtual outer periphery of the center pin, and even if the center pin is deformed by external forces, the slit edge part placed in the inside is difficult to damage the electrode body, so that the inner short circuit does not occur. Furthermore, JP-A-2003-229177 also shows an example that a plurality of window parts is formed on a side face of the center pin, so that the electrolyte flow in the battery is more improved.

However, in accordance with a demand for the improvement of the battery capacity, miniaturization of a space for placing the center pin has been advanced. Thus, in the related-art sealed batteries, when a vicinity of a bottom side face of the battery outer can is heated locally and rapidly, the battery may rarely burst. When meltage of a resin member with a low melting point such as a separator and of aluminum as a substrate of a positive electrode and the like moves by combustion gas, above described phenomena do not cause the problem if the meltage goes through from an opening of the center pin to outside. However, while moving, if the meltage contacts a member with a low temperature, the meltage is rapidly cooled to fix. If the fixed substance exists in the center pin, the center pin is lifted up by a pressure of the combustion gas and the leading end bumps against a sealing member. In such a state, the meltage passed in the center pin has no way out and is fixed at the bottom to clog the center pin, and the gas exhaust to the safety valve side is interfered with, thereby leading to a burst.

SUMMARY

Therefore, an advantage of some aspects of the invention is to provide a sealed battery which prevents an unwanted fixed substance from staying in the center pin and prevents a destructive accident reliably by normal working of the safety mechanism.

According to an aspect of the present invention, a sealed battery includes an electrode body formed by winding a positive electrode plate and a negative electrode plate which are placed to be opposed to each other with a separator interposed therebetween and having a hollow portion at the center, a cylindrical or tubular hollow center pin inserted in the hollow portion, a battery outer can containing the electrode body, and an external terminal also serving as a safety valve for evacuating gas when a gas pressure in the battery outer can exceeds a prescribed value. The center pin has a slit on its peripheral surface from one end in a longitudinal direction of the center pin to the other end, and has a cutout part on at least end of the center pin at the external terminal side.

In the sealed battery of the present aspect of the invention, a slit is formed on the peripheral surface parallel to the central axis of the center pin. If the battery has such structure, when a bottom side of an inside of the center pin in the battery outer can is blocked by meltage of a resin member having a low melting point such as a separator and of aluminum as the substrate of the positive electrode and the like by heating the sealed battery, a gas flow passage is secured between the inside of the center pin and the electrode body through the slit formed on the center pin. Furthermore, in the sealed battery of the present aspect of the invention, a cutout part is formed on at least the external terminal side end of the center pin placed in the hollow portion of the electrode body. If the battery has such structure, even if the center pin is lifted up and the external terminal side end of the center pin contacts with an external terminal, the gas flow passage is secured between the inside of the center pin and a top surface of the electrode body by the cutout part.

Thus, according to the sealed battery of the present aspect of the invention, even if the sealed battery itself is heated, and further even if the center pin is shot out from the hollow portion by an impact, vibration or the like, since the gas flow passage is secured between the inside of the center pin and the electrode body, the safety valve can work normally, so that the burst of the sealed battery can be inhibited. Moreover, since the center pin having these effects can be manufactured by bending the thin and long metal plate cylindrically and following forming the cutout part on at least one end, a sealed battery with good reliability can be obtained at low cost. The invention is equally applicable to any sealed batteries having a center pin at the central part of a spirally wound electrode body such as a nonaqueous electrolyte secondary battery and a nickel hydrogen secondary battery.

In the sealed battery of the present aspect of the invention, it is preferable that the cutout part is formed by one or more cutout faces inclined with respect to a central axis of the center pin.

The cutout part formed on the end of the tube-shaped center pin may be concave-convex shaped or serration shaped, however, if the cutout part is one or more cutout faces formed at an angle to the central axis of the center pin, the center pin is easy to be manufactured.

In the sealed battery of the present aspect of the invention, it is preferable that the cutout part is also formed on a bottom face side in the battery outer can.

If the cutout part is formed at the end of the tube-shaped center pin and the end is positioned at the bottom face side in the battery outer can, even if the meltage of a resin member having a low melting point such as a separator and of aluminum as the substrate of the positive electrode and the like is generated by heating the sealed battery, the gas flow passage is secured between the inside of the center pin and the bottom face of the electrode body through the cutout part. Thus, according to the sealed battery with the aspects, since the safety valve can work normally, the burst of the sealed battery can be inhibited.

In the sealed battery of the present aspect of the invention, the cut out part can be formed so as to have any of a plurality of sloped sides, serrations and intermittent concave-convex parts. Furthermore, the cutout part can be formed in a shape having an opening when an end face of the center pin is contacted to the electrode terminal.

According to the sealed battery of the present aspect of the invention, even if the center pin is lifted up and the external terminal side end of the center pin contacts with an external terminal, the gas flow passage is secured by forming an opening between the inside of the center pin and a top surface of the electrode body.

Furthermore, in the sealed battery of the present aspect of the invention, it is preferable that the slit formed in the center pin is formed parallel to a central axis of the center pin.

The center pin having the slit parallel to the central axis of the center pin is easy to be shaped, and since the gas flow passage can be secured, the burst of the sealed battery can be inhibited.

Furthermore, in the sealed battery of the present aspect of the invention, it is preferable that the edge part of the slit is placed inside of a virtual outer periphery of the center pin so as not the edge part thereof contact the electrode body.

If the edge part of the slit formed on the center pin is placed inside of the virtual outer periphery of the center pin, even if the center pin is deformed by external forces, the edge part of the slit is hard to damage the electrode body, so that the occurrence of an inner short circuit is inhibited. Thus, according to the sealed battery of the present aspect of the invention, even if the center pin is deformed by external forces, the sealed battery which is hard to generate an abnormal heat generation by the inner short circuit can be obtained.

BRIEF DESCRIPTION OF THE DRAWINGS

The invention will be described with reference to the accompanying drawings, wherein like numbers reference like elements.

FIGS. 2A to 2C are elevation views and transverse sectional views of the center pins of Examples 1 to 3, respectively, and FIGS. 2D and 2E are elevation views and transverse sectional views of the center pins of Comparative Examples 1 and 2, respectively.

FIG. 3A is a partially enlarged sectional view showing a state where the center pin of Example 1 is lifted up to contact a terminal part, and FIG. 3B is a partially enlarged sectional view showing a state where the center pin of Comparative Example 1 is lifted up to contact a terminal part.

DESCRIPTION OF EXEMPLARY EMBODIMENTS

Hereinafter, exemplary embodiments of the invention will be described in detail with examples, comparative examples, and drawings. However, the examples described below is an illustrative example of nonaqueous electrolyte secondary batteries for embodying the technical concept of the invention, is not intended to limit the invention to the examples, and may be equally applied to other exemplary embodiments included in the appended claims.

Figure 1:
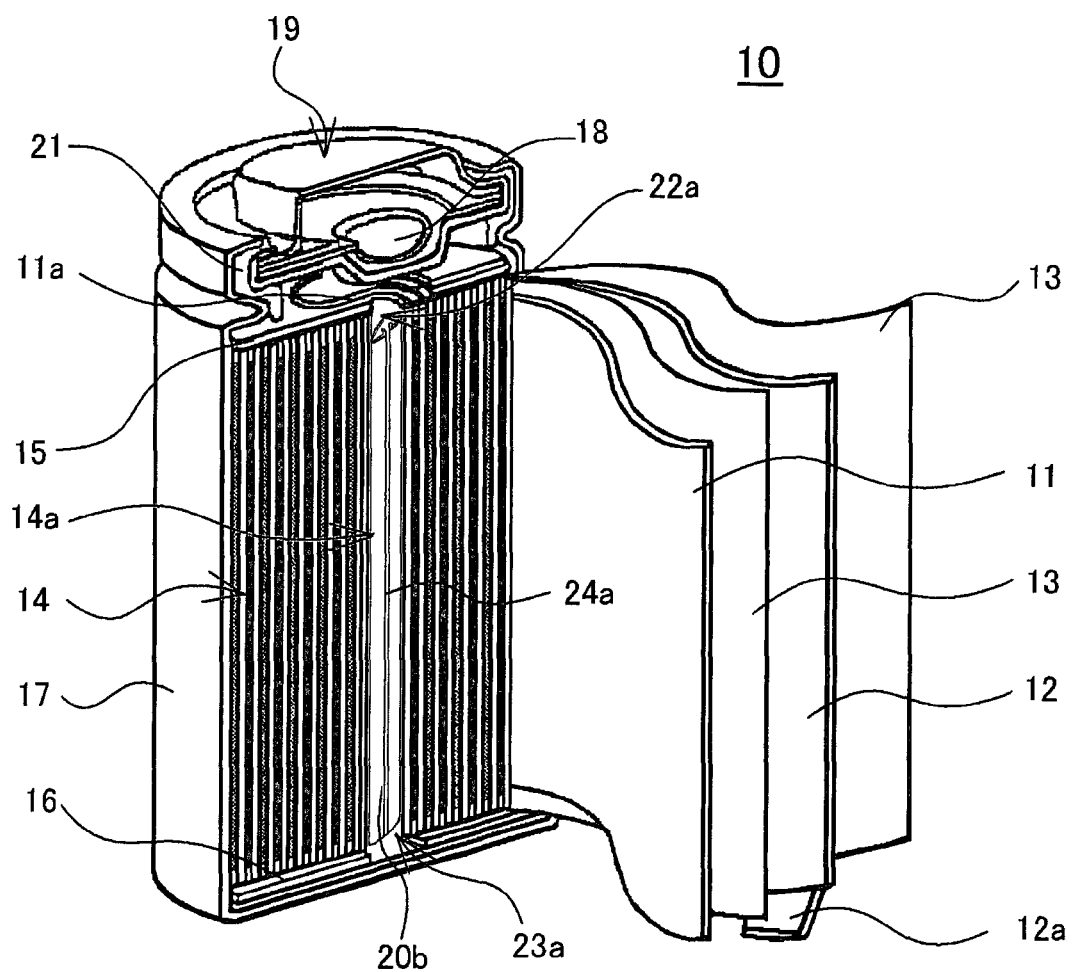
FIG. 1 is a perspective view showing a longitudinal section of a cylindrical-shaped nonaqueous electrolyte secondary battery as the sealed battery of Example 1.
Figure 4C:
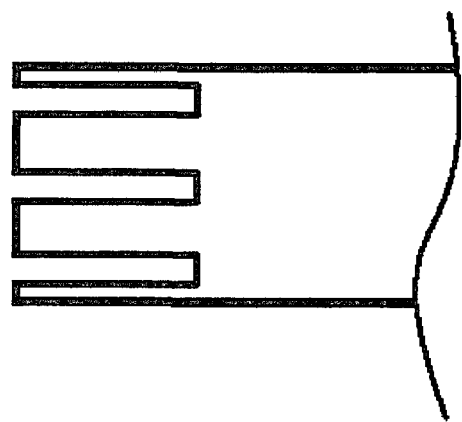
FIGS. 4A to 4C show examples of cutout parts of the center pins able to be used in the invention.
Figure 4B:
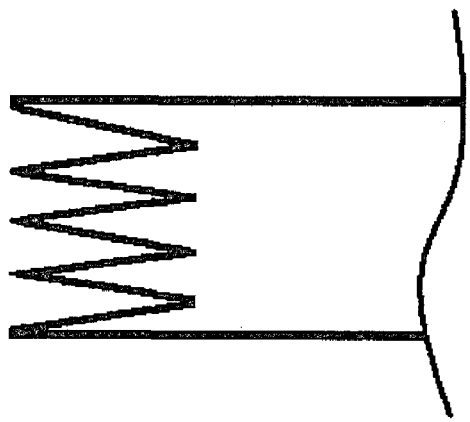
Figure 4A:
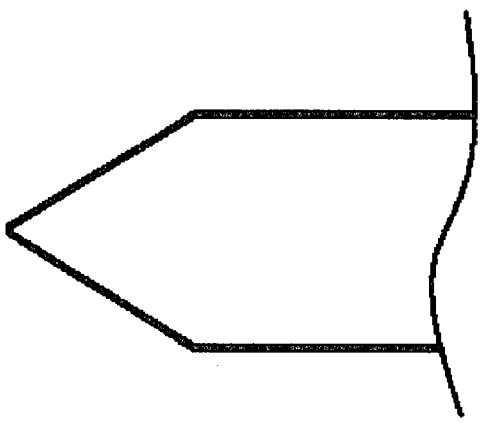

FIG. 1 is a perspective view showing a longitudinal section of the cylindrical-shaped nonaqueous electrolyte secondary battery as the sealed battery of Example 1. FIGS. 2A to 2C are elevation views and transverse sectional views of the center pins of Examples 1 to 3, respectively, and FIGS. 2D and 2E are elevation views and transverse sectional views of the center pins of Comparative Examples 1 and 2, respectively. FIG. 3A is a partially enlarged sectional view showing a state where the center pin of Example 1 is lifted up to contact a terminal part, and FIG. 3B is a partially enlarged sectional view showing a state where the center pin of Comparative Example 1 is lifted up to contact a terminal part. FIGS. 4A to 4C show examples of the cutout parts of the center pin able to be used in the invention.

Manufacture of Battery of Example 1

As shown in FIG. 1, the nonaqueous electrolyte secondary battery 10 of Example 1 had an electrode body 14 wound a positive electrode plate 11 and a negative electrode plate 12 interposing a separator 13 therebetween spirally, and a hollow portion 14a was formed at the center of the electrode body 14. Insulting plates 15 and 16 were placed on upper and lower faces of the electrode body 14, individually, and the whole was put into a cylindrical-shaped battery outer can 17 with a bottom also serving as a negative electrode terminal. The battery outer can 17 was a nickel-plated iron can.

Each central part of the insulating plates 15 and 16 was cut out to have the same shape as an opening of the hollow portion 14a. Then, a current collecting tab 12a of the negative electrode plate 12 was welded on an inner bottom part of the battery outer can 17, and a current collecting tab 11a of the positive electrode plate 11 was welded on a bottom plate part of a positive electrode terminal 19 also serving as a safety valve 18. Then, a nonaqueous electrolyte not shown in the figures was poured into the battery outer can 17, and an opening of the battery outer can 17 was sealed with the positive electrode terminal 19 also serving as the safety valve 18.

An example of a manufacturing method of the positive electrode plate 11 is as follows. First, as a positive electrode active material, lithium nickel cobalt manganese composite oxide and lithium cobalt oxide were weighed so as to have a mass ratio of 1:9, and the positive electrode active material, carbon as a positive electrode conductive material, and polyvinylidene fluoride (PVdF) powder as a binder were added to N-methyl-2-pyrrolidone (NMP) with a mass ratio of positive electrode active material:carbon:PVdF=94:3:3 and kneaded to prepare a slurry. The slurry was applied on both sides of an aluminum foil substrate with a thickness of 15 μm by a doctor blade method and then dried to form a positive electrode active material layer on both sides of the aluminum foil substrate. Then, the positive electrode plate 11 was manufactured by compression using a compression roller. The manufactured positive electrode plate 11 has, for example, a length of 700 mm, a width of 55 mm, and a thickness of 150 μm.

Furthermore, an example of a manufacturing method of the negative electrode plate 12 is as follows. First, a graphite powder as a negative electrode active material and a dispersion liquid of styrene-butadiene rubber (SBR) (styrene:butadiene=1:1) as a binder were dispersed in water, and further carboxymethyl cellulose (CMC) as a thickener was added to prepare a negative electrode active material mixture slurry. The negative electrode active material mixture slurry was prepared so as to have, for example, the dry mass ratio of graphite:SBR:CMC=95:3:2. The negative electrode active material mixture slurry was applied on both sides of a copper foil substrate with a thickness of 10 μm by a doctor blade method, dried, and then compressed with a compression roller to manufacture the negative electrode plate 12. The manufactured negative electrode plate 12 has, for example, a length of 750 mm, a width of 57 mm, and a thickness of 150 μm.

As an example of a manufacturing method of the electrolyte, $LiPF_6$ was dissolved in a mixed solvent of fluoroethylene carbonate (FEC) and methyl ethyl carbonate (MEC) with a volume ratio of 20:80 (20° C.), so as to be 1 mol/liter to obtain the nonaqueous electrolyte.

The spirally wound electrode body 14 was specifically manufactured by the following method. First, the positive electrode plate 11 and the negative electrode plate 12 interposing the separator 13 of polyethylene microporous membrane (a thickness of 22 μm) were overlapped with insulation from each other and wound around a winding core member (not shown in the figures). Here, at the overlapped state, the separator 13 was arranged on the lowermost layer and the uppermost layer. The separator 13 was larger in length and width than the positive electrode plate 11 and the negative electrode plate 12. On the other hand, the negative electrode plate 12 is larger in width than the positive electrode plate 11.

One end of the aluminum current collecting tab 11a was welded to a winding start part of the positive electrode plate 11. One end of the nickel current collecting tab 12a was welded to a winding end part of the negative electrode plate 12. The current collecting tabs 11a and 12a were flexible flat plates and each surface was covered with an insulating film except the welded part at both ends. Furthermore, the outermost periphery of the spirally wound electrode body 14 was taped with insulating tape to keep the wound state. Furthermore, the winding core member was removed, and the spirally wound electrode body 14 was insert into the cylindrical shaped battery outer can 17 with contacting a bottom part of the electrode body 14 to the insulating plate 16 having an opening in its center, and the negative electrode current collecting tab 12a was welded to an inner central part of the battery outer can 17 through a hollow portion 14a generated by removing the winding core member from the electrode body 14.

Next, as the center pin of Example 1, a center pin 20a having a shape shown in FIG. 2A was prepared. The center pin 20a was manufactured by the followings method. First, a stainless steel metal plate (a thickness of 0.35 mm) was bent cylindrically and both edge parts across the width of the metal plate were bent so as to place inner of a virtual outer periphery of the center pin 20a to form a column with a slit 24a, and then both ends in a longitudinal direction of the column were cut out so as to have oblique faces with respect to the central axis to form cutout parts 22a and 23a. A cross section of the center pin 20a is almost heart-shaped and the center pin 20a has a length of 60 mm and an external diameter of 3 mm.

Furthermore, the center pin 20a was inserted into the hollow portion 14a of the spirally wound electrode body 14. Then, an insulating plate 15 having an opening at its center was contacted to an upper part of the spirally wound electrode body 14, and the positive electrode current collecting tab 11a was threaded into the opening of the insulating plate 15, and a leading end of the positive electrode current collecting tab 11a was welded to the positive electrode terminal 19 also serving as the safety valve 18.

Then, a predetermined amount of a nonaqueous electrolyte was poured into the battery outer can 17, and then an insulating gasket 21 was contacted to a periphery of the positive electrode terminal 19 also serving as the safety valve 18 to insulate electrically between the positive electrode terminal 19 and the battery outer can 17, and a leading end part of the battery outer can 17 was crimped to obtain the nonaqueous electrolyte secondary battery 10 as the sealed battery of Example 1. The safety valve 18 is arranged in order to evacuate gas from the nonaqueous electrolyte secondary battery 10 when the pressure in the battery exceeds a predetermined value by gas generation in the nonaqueous electrolyte secondary battery 10. Furthermore, the nonaqueous electrolyte secondary battery 10 of Example 1 is a cylindrical-shape with a diameter of 18 mm and a height of 65 mm, and the design capacity is 2800 mAh.

Manufacture of Batteries of Examples 2 and 3 and Comparative Examples 1 and 2

A center pin 20b used for the nonaqueous electrolyte secondary battery of Example 2 was manufactured by the following method. As shown in FIG. 2B, a stainless steel metal plate (a thickness of 0.35 mm) was bent cylindrically to form a column having a slit 24*b*, and both ends in a longitudinal direction of the column were cut out so as to have oblique faces with respect to the central axis to form cutout parts 22*b* and 23*b*. A cross section shape of the center pin 20*b* is C-shaped and the center pin 20*b* has a length of 60 mm and an external diameter of 3 mm. Furthermore, a center pin 20*c* used for the nonaqueous electrolyte secondary battery of Example 3 has a slit 24*c*, and further has a structure similar to the center pin 20*b* of Example 2 except that a cutout part 22*c* was formed only on the positive electrode terminal 19 side.

On the other hand, a center pin 20*d* used for the nonaqueous electrolyte secondary battery of Comparative Example 1 has a slit 24*d*, and further has a structure similar to the center pin 20*b* of Example 2 except that a cutout part 23*d* was formed only on an inner bottom side of the battery outer can 17. In addition, a center pin 20*e* used for the nonaqueous electrolyte secondary battery of Comparative Example 2 has a slit 24*e*, and further has a structure similar to the center pin 20*a* of Example 1 except that no cutout part was formed at both ends. Nonaqueous electrolyte secondary batteries (not shown) as the sealed batteries of Examples 2 and 3 and Comparative Examples 1 and 2 were manufactured in the same manner as in Example 1 except that the center pins 20*b* to 20*e* of Examples 2 and 3 and Comparative Examples 1 and 2 formed as above were used.

Burning Test

The following burning test was carried out with respect to the nonaqueous electrolyte secondary batteries of Examples 1 to 3 and Comparative Examples 1 and 2 manufactured as above. First, each of the nonaqueous electrolyte secondary batteries of Examples 1 to 3 and Comparative Examples 1 and 2 was overcharged at a constant current of 1 It=2800 mA until each battery voltage reached 4.3 V, and then each bottom side part of the battery outer cans of the batteries was heated by using a burner to count the number of the burst batteries. The burning test was carried out with respect to 50 pieces of each nonaqueous electrolyte secondary battery of Examples 1 to 3 and Comparative Examples 1 and 2. The results are shown in the following Table.

TABLE 1

| Example 1 | Example 2 | Example 3 | Comparative Example 1 | Comparative Example 2 |
| --- | --- | --- | --- | --- |
| 0 piece/ 50 pieces | 0 piece/ 50 pieces | 0 piece/ 50 pieces | 2 pieces/ 50 pieces | 3 pieces/ 50 pieces |

The values in Table 1 show (the number of burst batteries/ the number of tested batteries). From the result shown in Table 1, the followings are found. That is, whether the cross section is heart-shaped or C-shaped, when the cutout part is formed on the positive electrode terminal 19 side of the center pin having the slit in the axis direction, none of the 50 pieces of the batteries burst, and very good results are obtained. On the contrary, though the center pin had a slit in the axis direction, in Comparative Examples 1 and 2 using the center pins which a cutout part was not formed on the positive electrode terminal 19 side, 2 out of 50 (Comparative Example 1) and 3 out of 50 (Comparative Example 2) are burst.

The reason why the differences between these effects were caused will be explained by using FIG. 3. FIG. 3A is a partially enlarged sectional view showing the state where the center pin 20*a* of Example 1 is lifted up to contact the positive electrode terminal 19, and FIG. 3B is a partially enlarged sectional view showing the state where the center pin 20*d* of Comparative Example 1 is lifted up to contact the positive electrode terminal 19. These uplifts of the center pins are caused by the meltage flowing into the center pin of the battery subjected to the heating test and being solidified, and then the center pin is lifted up by the pressure of the generated gas in the battery.

As apparent from FIG. 3A, in the case of Example 1, if the center pin 20*a* contacts the positive electrode terminal 19, a gas flow passage is secured between the inside of the battery and the inside of the center pin 20*a* through the cutout part 22*a* of the center pin 20*a*. The same phenomenon occurs in the cases of Examples 2 and 3. On the other hand, in the case of Comparative Example 1, as shown in FIG. 3B, the gas flow passage between the inside of the center pin 20*d* and the inside of the battery is closed by the positive electrode terminal 19. The same phenomenon occurs in the case of Comparative Example 2. Accordingly, in order not to burst the battery even though the battery is under a high temperature, whether the cross section is heart-shaped or C-shaped, it is clear that the center pin having a slit in the axis direction needs to have a cutout part on the positive electrode terminal 19 side.

Furthermore, obtained the similar results when Examples 2 and 3 are compared and the comparison of the results of Examples 2 and 3 and Comparative Example 1 show that it is not indispensable that the center pin having a slit in the axis direction has a cutout part on the bottom side in the battery outer can. However, in consideration of the results of Comparative Examples 1 and 2, the center pin having a cutout part on the bottom side of the battery outer can is recommended.

In Examples 1 to 3, the example that each of the cutout parts 22*a* to 22*c* formed on the positive electrode terminal 19 side of the center pins 20*a* to 20*c*, respectively, is straightly cut on the bias so as to have a sloped side. However the invention is not limited to the shape, for example as shown in FIG. 4A, the pin may be cut so as to have a plurality of sloped sides, as shown in FIG. 4B, the pin may be cut so as to have serrations, or, as shown in FIG. 4C, the pin may be formed so as to have concave-convex parts intermittently. That is, as for the cutout part, any center pins which are formed so as to have an opening when an end face of the center pin is contacted to the positive electrode terminal 19 can be used.

In Examples 1 to 3 and Comparative Examples 1 and 2, the example that the negative electrode 12 also has the current collecting tab 12*a* and the current collecting tab 12*a* is welded to the inner bottom part of the battery outer can 17 is shown. However, if the current collecting tab 12*a* is electrically-connected to the battery outer can 17 reliably, the tab may be welded to anywhere of the battery outer can 17, or the battery may be formed so that the outermost peripheral electrode contacts to the battery outer can 17 directly. Furthermore, in the examples of the invention, the spirally wound electrode body 14 having the positive electrode 11 at the inner perimeter side and the negative electrode 12 at the outer perimeter side is mentioned. However if the positions of the positive electrode 11 and the negative electrode 12 are changed, the battery has the similar effect.

Furthermore, in Examples 1 to 3 and Comparative Examples 1 and 2, each of the slits 24*a* to 24*e* of the center pins 20*a* to 20*e* is formed parallel to the central axis of the center pin, however the slit may be formed on the peripheral surface of the center pin inclined with respect to the central axis, or may be formed on the peripheral surface of the center pin spirally, and both slits have the function as the gas flow passage.

What is claimed is:

1. A sealed battery comprising:
    an electrode body formed by winding a positive electrode plate and a negative electrode plate which are placed to be opposed to each other with a separator interposed therebetween and having a hollow portion at the center;

a cylindrical center pin inserted in the hollow portion;

a battery outer can containing the electrode body; and an external terminal also serving as a safety valve for evacuating gas when a gas pressure in the battery outer can exceeds a prescribed value, the center pin having a slit formed on its peripheral surface from one end in a longitudinal direction of the center pin to the other end, and having a cutout part formed on at least a terminal end of the center pin at the external terminal side.

2. The sealed battery according to claim 1, wherein the cutout part is formed by one or more cutout faces inclined with respect to a central axis of the center pin.

3. The sealed battery according to claim 1, wherein the cutout part is also formed on an end of the center pin on a bottom face side in the battery outer can.

4. The sealed battery according to claim 2, wherein the cutout part is also formed on an end of the center pin on a bottom face side in the battery outer can.

5. The sealed battery according to claim 1, wherein the cutout part is formed so as to have any of a plurality of sloped sides, serrations and intermittent concave-convex parts.

6. The sealed battery according to claim 1, wherein the cutout part is formed in a shape having an opening when an end face of the center pin is contacted to the electrode terminal.

7. The sealed battery according to claim 2, wherein the slit formed in the center pin is formed parallel to a central axis of the center pin.

8. The sealed battery according to claim 1, wherein the slit formed on the center pin is placed inside of a virtual outer periphery of the center pin so as not the edge part thereof contact the electrode body.

* * * * *